(12) United States Patent
Tufte

(10) Patent No.: US 7,258,472 B2
(45) Date of Patent: Aug. 21, 2007

(54) ILLUMINATED RUBRAIL/BUMPER ASSEMBLY

(75) Inventor: Brian N. Tufte, Eden Prairie, MN (US)

(73) Assignee: i3 Ventures, LLC, Eden Prairie, MN (US)

( * ) Notice: Subject to any disclaimer, the term of this patent is extended or adjusted under 35 U.S.C. 154(b) by 256 days.

(21) Appl. No.: 10/147,097

(22) Filed: May 13, 2002

(65) Prior Publication Data

US 2003/0209183 A1 Nov. 13, 2003

Related U.S. Application Data

(63) Continuation of application No. 09/991,078, filed on Nov. 16, 2001, now Pat. No. 6,655,824, which is a continuation-in-part of application No. 09/372,643, filed on Aug. 11, 1999, now Pat. No. 6,371,634.

(51) Int. Cl.
*B60R 19/50* (2006.01)
*B60Q 1/32* (2006.01)

(52) U.S. Cl. ............... 362/505; 362/477; 362/369; 293/117; 114/219; 405/212

(58) Field of Classification Search ............. 362/31, 362/477, 496, 540, 543, 252, 505, 84, 551, 362/559, 61, 581, 511, 369, 546; 114/343, 114/219, 220; 405/212, 215; 293/117
See application file for complete search history.

(56) References Cited

U.S. PATENT DOCUMENTS 1,647,014 A 10/1927 Pattison
1,729,274 A * 9/1929 Millar .................. 362/505
1,779,180 A 10/1930 Macrae et al.
1,972,283 A 9/1934 Zimmers (Continued)

FOREIGN PATENT DOCUMENTS

FR 2727498 11/1994

(Continued)

OTHER PUBLICATIONS

Light Tech LLC., "Decorative Cable Lights," brochure, copyright 1998.

(Continued)

*Primary Examiner*—Jong-Suk (James) Lee
*Assistant Examiner*—Ismael Negron
(74) *Attorney, Agent, or Firm*—Brian N. Tufte

(57) ABSTRACT

An illuminated bumper assembly having an elongated light source for emitting light rays and an elongated bumper for carrying the elongated light source. The elongated bumper is adapted to allow light rays from the elongated light source to be emitted along its length. In some embodiments, the elongated bumper has a primary bumper surface that faces away from a protected surface, and the elongated bumper is structured to engage one or more approaching objects and at least partially protect the protected surface from the one or more approaching objects. In some cases, the elongated light source may be situated between the primary bumper surface and the protected surface such that the primary bumper surface also helps protect the elongated light source from the one or more objects. The illuminated bumper may be adapted for use on boats and/or other applications, as desired.

38 Claims, 16 Drawing Sheets

U.S. PATENT DOCUMENTS

| | | | |
|---|---|---|---|
| 2,277,433 A | 3/1942 | Guth | |
| 2,300,067 A | 10/1942 | Schwab | |
| 2,339,085 A | 1/1944 | Luckiesh | |
| 2,525,001 A | 10/1950 | Sherwood | |
| 2,561,756 A | 7/1951 | Shock | |
| 2,587,807 A | 3/1952 | Arenberg et al. | |
| 2,930,885 A | 3/1960 | Ehrenfreund | |
| 2,959,146 A * | 11/1960 | Erkert ........................ | 114/219 |
| 3,140,111 A | 7/1964 | Dabroski | |
| 3,196,265 A | 7/1965 | Schneider | |
| 3,197,189 A | 7/1965 | Pemper et al. | |
| 3,317,722 A | 5/1967 | Whitney | |
| 3,359,030 A | 12/1967 | Newman | |
| 3,473,836 A | 10/1969 | Halter | |
| 3,551,723 A | 12/1970 | Van Groningen | |
| 3,612,848 A | 10/1971 | Koch et al. | |
| 3,639,748 A | 2/1972 | Pearson et al. | |
| 3,675,527 A | 7/1972 | Reeder, Jr. | |
| 3,722,876 A | 3/1973 | Schwenk | |
| 3,865,358 A | 2/1975 | Butters | |
| 4,107,767 A | 8/1978 | Anquetin | |
| 4,213,644 A | 7/1980 | Scrivo et al. | |
| 4,245,281 A | 1/1981 | Ziaylek, Jr. | |
| 4,270,787 A | 6/1981 | Savell | |
| 4,360,859 A | 11/1982 | Ziaylek, Jr. | |
| 4,376,966 A | 3/1983 | Tieszen | |
| 4,418,378 A | 11/1983 | Johnson | |
| 4,445,163 A | 4/1984 | Ziaylek, Jr. | |
| 4,625,266 A | 11/1986 | Winter | |
| 4,740,870 A | 4/1988 | Moore et al. | |
| 4,947,293 A | 8/1990 | Johnson et al. | |
| 4,954,932 A | 9/1990 | Isenga | |
| 4,955,044 A | 9/1990 | Amstutz et al. | |
| 4,964,760 A | 10/1990 | Hartman | |
| 4,996,634 A | 2/1991 | Haneda et al. | |
| 5,021,931 A * | 6/1991 | Matsui et al. .................. | 362/84 |
| 5,096,753 A | 3/1992 | McCue et al. | |
| 5,122,933 A | 6/1992 | Johnson | |
| 5,180,223 A | 1/1993 | McNamee | |
| 5,268,824 A | 12/1993 | Czipri | |
| 5,304,993 A | 4/1994 | Handsaker | |
| 5,383,100 A * | 1/1995 | Kikos ........................ | 362/34 |
| 5,410,458 A | 4/1995 | Bell | |
| 5,434,013 A | 7/1995 | Fernandez | |
| 5,469,342 A | 11/1995 | Chien | |
| 5,475,574 A | 12/1995 | Chien | |
| 5,485,355 A | 1/1996 | Voskoboinik et al. | |
| 5,495,401 A * | 2/1996 | Evans ........................ | 362/477 |
| 5,499,170 A | 3/1996 | Gagne | |
| 5,523,923 A | 6/1996 | Stowe, Jr. | |
| 5,566,384 A | 10/1996 | Chien | |
| 5,570,945 A | 11/1996 | Chien et al. | |
| 5,579,429 A * | 11/1996 | Naum ........................ | 385/143 |
| 5,611,621 A | 3/1997 | Chien | |
| 5,613,750 A | 3/1997 | Roe | |
| 5,636,916 A | 6/1997 | Sokolowski | |
| 5,678,914 A | 10/1997 | Dealey et al. | |
| 5,680,496 A * | 10/1997 | Burkitt et al. .............. | 385/100 |
| 5,711,592 A | 1/1998 | Hotta | |
| 5,730,079 A | 3/1998 | Totty et al. | |
| 5,737,472 A | 4/1998 | Bernasson et al. | |
| 5,746,501 A | 5/1998 | Chien | |
| 5,775,016 A | 7/1998 | Chien | |
| 5,869,930 A | 2/1999 | Baumberg et al. | |
| 5,871,269 A | 2/1999 | Chien | |
| 5,873,646 A | 2/1999 | Fjaestad et al. | |
| 5,903,695 A | 5/1999 | Zarian et al. | |
| 5,915,830 A | 6/1999 | Dickson et al. | |
| 5,917,288 A | 6/1999 | Feldman et al. | |
| 6,019,476 A | 2/2000 | Kischner | |
| 6,033,085 A | 3/2000 | Bowker | |
| 6,050,211 A | 4/2000 | Yamaguchi | |
| 6,074,071 A | 6/2000 | Baumberg et al. | |
| 6,082,867 A | 7/2000 | Chien | |
| 6,113,246 A | 9/2000 | Rub | |
| 6,120,160 A | 9/2000 | Nakagawa | |
| 6,152,586 A | 11/2000 | Dealey et al. | |
| 6,179,431 B1 | 1/2001 | Chien | |
| RE37,113 E | 3/2001 | Shimada | |
| 6,231,217 B1 * | 5/2001 | Krippelz, Sr. .............. | 362/477 |
| 6,270,229 B1 | 8/2001 | Chien | |
| 6,364,293 B1 | 4/2002 | Beckett | |
| 6,371,634 B1 | 4/2002 | Tufte | |
| 6,450,678 B1 | 9/2002 | Bayersdorfer | |
| 6,461,028 B1 | 10/2002 | Huang | |
| 6,474,851 B1 | 11/2002 | Baley | |
| 6,511,204 B2 | 1/2003 | Emmel et al. | |
| 6,592,245 B1 * | 7/2003 | Tribelsky et al. ........... | 362/551 |
| 6,742,916 B1 * | 6/2004 | Dunn ........................ | 362/477 |

FOREIGN PATENT DOCUMENTS

| | | |
|---|---|---|
| WO | WO96/13687 | 5/1996 |
| WO | WO 00/42456 | 7/2000 |

OTHER PUBLICATIONS

Flex Glo Wire, Inc., "Flex Glo Wire Specifications," Oct. 15, 1998.
Selected pages from http://www.aqualuce.com/montkaj.html, 2 pages, downloaded Jun. 3, 2000.
"Eagle Mouldings Specialty Trim & Extrusions," brochure, 6 pages, prior to Aug. 11, 1999.
Lumenyte International Corporation, "Cove Lighting Applications," 1 page, copyright, Mar. 19, 1998.
Lumenyte International Corporation, "Sta-Flex LEF™ 510M Linear Emitting Fiber," 2 pages, copyright Mar. 6, 2001.
Lumenyte International Corporation, "Sta-Flex LEF™ 310 Linear Emitting Fiber," 2 pages, copyright Mar. 19, 1998.
Lumenyte International Corporation, "Sta-Flex SFR™ 510 Linear Fiber," 2 pages, copyright Mar. 19, 1998.
Lumenyte International Corporation, "Sta-Flex SFR™ 410M Linear Emitting Fiber," 2 pages, copyright Mar. 6, 2001.
3M Marine Products, http://www.3m.com/US/auto_marine_aero/marine/catalog/index.jhtml, 1 page, downloaded Feb. 11, 2002.
3M Automotive, Marine and Aerospace, http://products.3m.com/usenglish/auto_marine_aero/marine.jhtml, 1 page, downloaded Feb. 11, 2002.
3M United States, http://www.3m.com/about3M/technologies/lightfiber, 30 pages, downloaded Feb. 11, 2002.
http://www.elam.co.il, 24 pages, downloaded Feb. 11, 2002.
U.S. Appl. No. 09/991,078, filed Nov. 16, 2001, entitled, "Lighting Apparatus."
U.S. Appl. No. 10/074,162, filed Feb. 12, 2002, entitled, "Lighting Apparatus."
U.S. Appl. No. 10/074,364, filed Feb. 12, 2002, entitled, "Lighting Apparatus."
U.S. Appl. No. 10/074,356, filed Feb. 12, 2002, entitled, "Lighting Apparatus."
U.S. Appl. No. 10/074,362, filed Feb. 12, 2002, entitled, "Lighting Apparatus."
U.S. Appl. No. 10/075,488, filed Feb. 12, 2002, entitled, "Lighting Apparatus."
U.S. Appl. No. 10/075,489, filed Feb. 12, 2002, entitled, "Lighting Apparatus."
"2004 Marine Product Catalog," Taco Metals, 128 pages, 2004. (Previously provided).
"2006 Marine Products Catalog," Taco Metals, 122 pages, 2006. (Previously provided).

* cited by examiner

ILLUMINATED RUBRAIL/BUMPER ASSEMBLY

This application is a continuation of U.S. patent application Ser. No. 09/991,078, filed Nov. 16, 2001 and now U.S. Pat. No. 6,655,824, which is a continuation-in-part of U.S. patent application Ser. No. 09/372,643, filed Aug. 11, 1999 and now U.S. Pat. No. 6,371,634.

BACKGROUND OF THE INVENTION

This invention relates to lights, and more particularly, to boat lights adapted for use with boats, personal watercraft or the like.

33 USC 2020 (Rule 20) states that power driven and sailing vessels less than 20 meters operating between sunset and sunrise or in times of restricted visibility must have operating navigation lights. In defining the navigation lighting requirements, 33 USC 2030 (Rule 23) states that the basic running lights must including a white stern light, a red port light and a green starboard light. The red port light and green starboard light must be visible from forward of the boat as well as the sides. The three running lights may be mounted in a number of ways, separately or combined, high or low, but must always be masked so that the appropriate color is seen from each direction.

33 USC 2030 (Rule 23) states that a powerboat must show a white masthead light that is visible from the front of the boat. This masthead light must be mounted higher than the running lights. Depending on the angle relative to the powerboat, the masthead light may or may not appear to be in line with the visible running light, but must be higher than the running lights. Other lighting configurations are provided for vessels more than 20 meters.

While these lighting configurations may be adequate for experienced boaters traveling relatively low traffic waterways under good weather conditions, they are less desirable under other conditions. Many of today's waterways are extremely crowded, often occupied with high powered boats driven by inexperienced and inattentive drivers. Safely operating a boat at night under these conditions can be a challenge. Depth perception is limited, and lights along the shoreline can cast misleading reflections on the water. In many instances, simply identifying boats via the basic running lights can be difficult, let along determining the size, direction, speed, and other factors needed to safely travel the waterways.

SUMMARY OF THE INVENTION

The present invention overcomes many of the disadvantages of the prior art by providing a boat lighting apparatus that improves the visibility of a boat by illuminating one or more side surfaces of the hull of the boat. The hull of the boat provides a relatively large area that, when illuminated, can significantly increase the visibility of a boat. In addition, the size, direction, and speed of a boat can more readily be determined, even by novice or inattentive boaters. It is believed that by providing such visibility, boat safety can be significantly improved.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
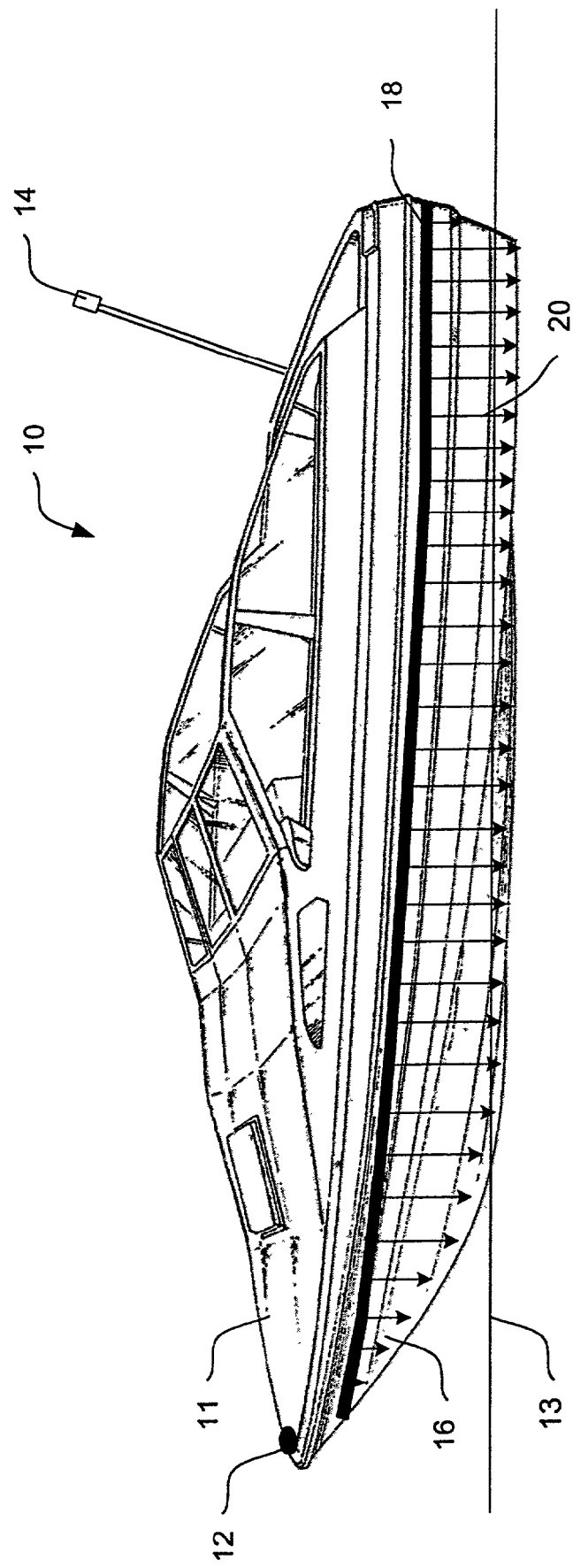
FIG. 1 is a perspective view of a boat having a first illustrative boat lighting apparatus.

FIG. 1 is a perspective view of a boat 10 having a first illustrative boat lighting apparatus in accordance with the present invention. The boat is generally shown at 10, and includes an upper deck 11 extending over a hull 16. The hull 16 extends generally down from the upper deck 11 toward an expected water line 13. The hull 16 may also extend generally inward, as shown.

Prior art navigation lights typically include forward running lights 12 and a rear masthead light 14. The forward running lights 12 typically include a red port light and a green starboard light. In most cases, the forward running lights 12 are provided in a relatively small housing mounted to the front of the boat. The rear masthead light 14 is shown mounted higher than the forward running lights 12, and is visible from the front of the boat.

As indicated above, this lighting configuration may be adequate for experienced boaters traveling in relatively low traffic waterways under good weather conditions. However, under other conditions, they are less desirable. Many of today's waterways are extremely crowded, often occupied with high powered boats driven by inexperienced and inattentive boaters. Safely operating a boat at night under these conditions can be a challenge. Depth perception is limited, and lights along the shoreline can cast misleading reflections on the water. In many instances, simply identifying boats via the forward running lights 12 and the masthead light 14 can be difficult, let along determining the size, direction, speed, and other factors needed to safely travel the waterways.

To augment the basic running lights 12 and 14 shown in FIG. 1, the present invention contemplates providing a boat lighting apparatus that improves the visibility of a boat by illuminating one or more side surfaces of the hull 16 of the boat 10. The hull 16 of the boat provides a relatively large area that, when illuminated, can significantly increase the visibility of a boat 10. In addition, the size, direction, and speed of a boat 10 can more readily be determined, even by novice or inattentive boaters. It is believed that by providing such visibility, boat safety can be significantly improved.

In the illustrative embodiment shown in FIG. 1, a boat lighting apparatus 18 is provided along the length of the hull 16 of the boat 10. The boat lighting apparatus 18 includes one or more light sources for producing light rays 20. The boat lighting apparatus 18 may be mounted to the boat and configured such that at least a portion of the light rays 20 illuminate a portion of the hull 16. In the embodiment shown, the boat lighting apparatus 18 provides light rays 20 that illuminate a substantial portion of the outer surface of the hull 16. Although not shown, the boat lighting apparatus 18 may continue around the perimeter of the boat hull 16, and illuminate both side surfaces of the hull and the back surface of the hull. The boat lighting apparatus 18 may provide a different color light for each side of the boat, such as a red light on the port side, a green light on the starboard side and a while light on the back side.

It is contemplated that the boat lighting apparatus 18 may or may not include a redirector (see below) for redirecting at least a portion of the light rays 20 to the side surface of the hull 16. The redirector may also prevent at least a portion of the light rays from traveling horizontally away and/or upward from the hull 16 of the boat 10.

A method of the present invention includes the steps of providing one or more light sources, and mounting the one or more light sources to the boat such that when energized, the one or more light sources illuminate a the side surface of the hull 16.

Figure 2:
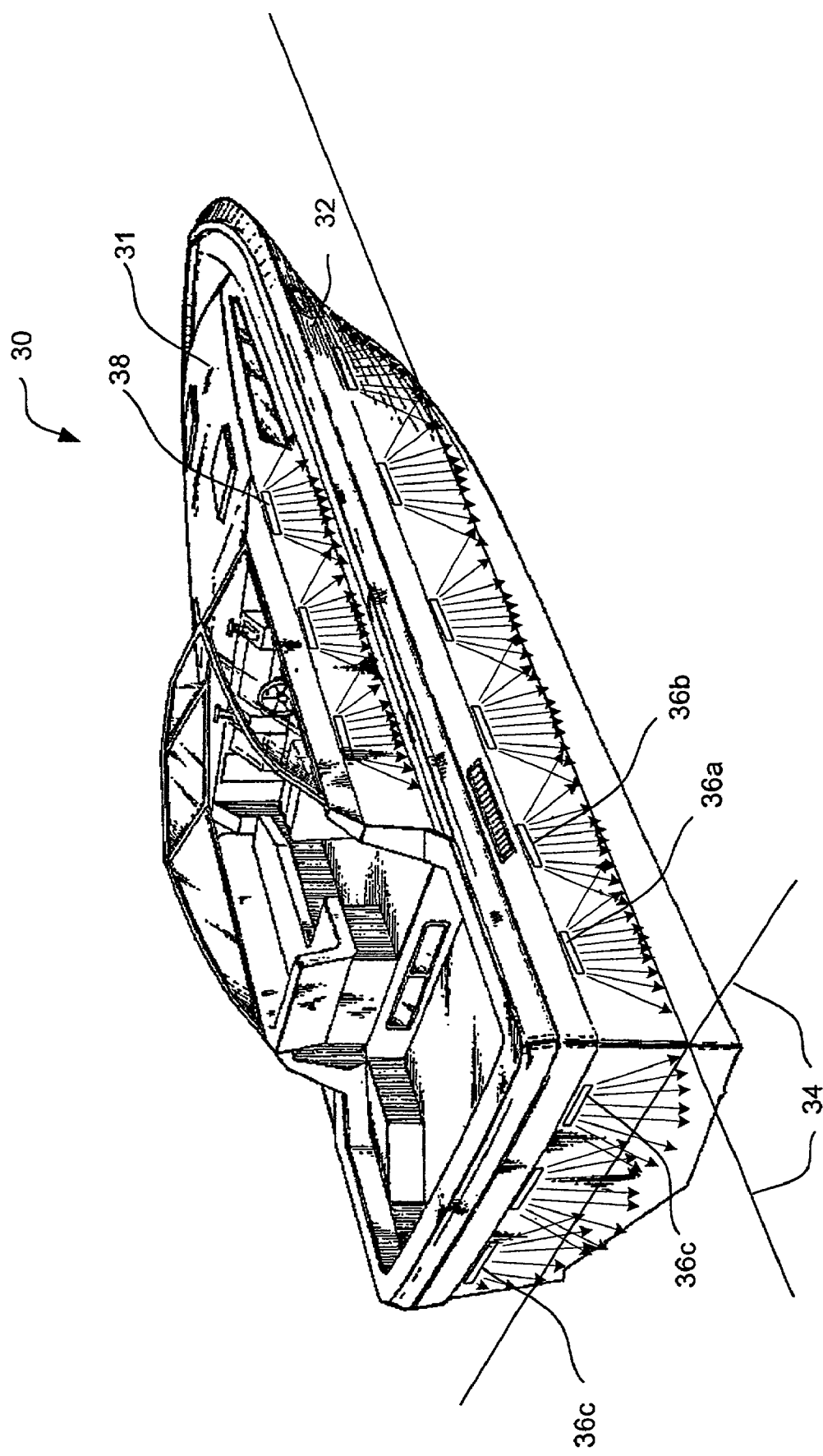
FIG. 2 is a perspective view of a boat having another illustrative boat lighting apparatus.

FIG. 2 is a perspective view of a boat having another illustrative boat lighting apparatus. The boat is generally shown at 30, and includes an upper deck 31 extending over a hull 32. The hull 32 extends generally down from the upper deck 31 toward an expected water line 34. The hull 32 may also extends generally inward, as shown. In this embodiment, a number of boat lights 36a, 36b, 36c and 36d are mounted to the hull 32 of the boat 30. Boat lights 36a and 36b are mounted to the starboard side of the hull 32, and boat lights 36c and 36d are mounted to the back of the hull 32.

Figure 3:
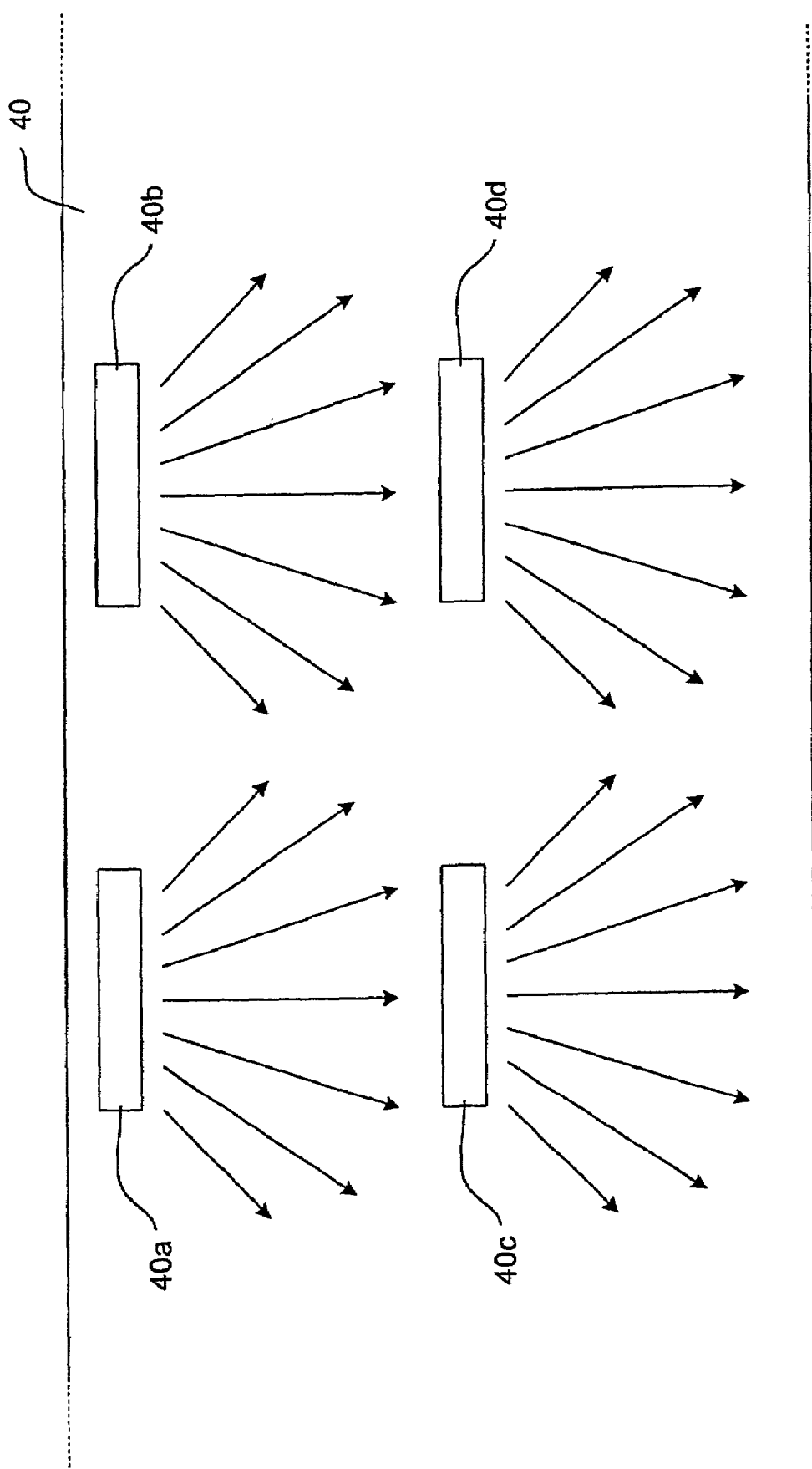
FIG. 3 is a schematic view of a boat hull having a number of boat lights, each directing light rays in a downward direction.
Figure 4:
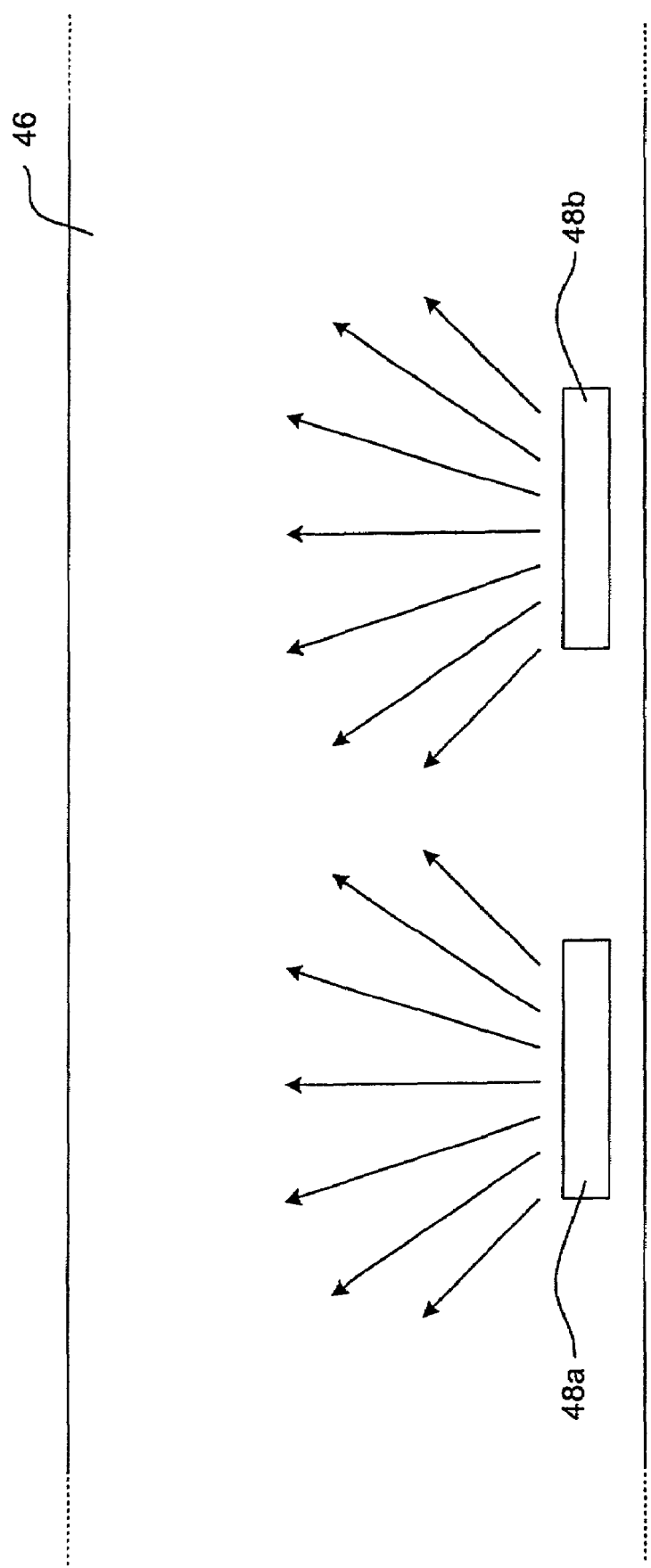
FIG. 4 is a schematic view of a boat hull having a number of boat lights, each directing light rays in an upward direction.
Figure 5:
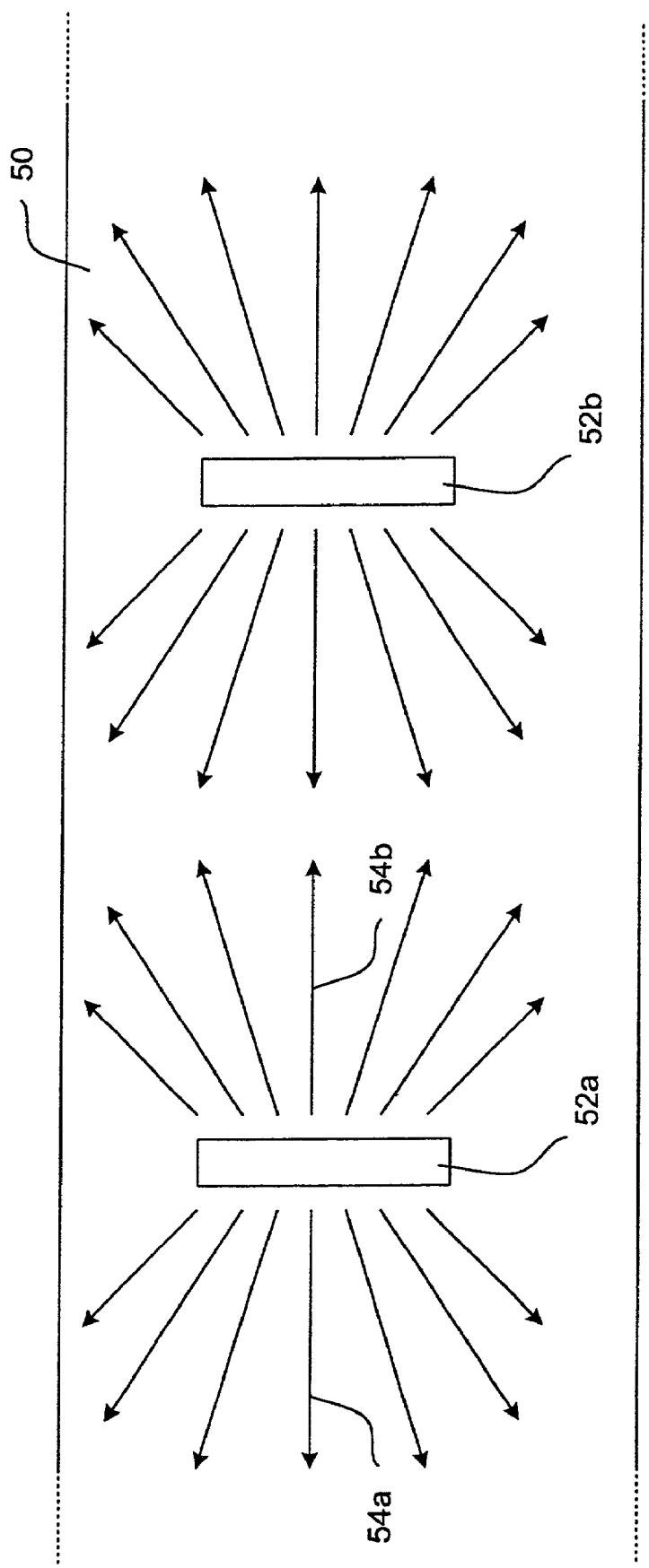
FIG. 5 is a schematic view of a boat hull having a number of boat lights, each directing light rays in forward and backward direction.

In the illustrative embodiment, each of the boat lights 36a, 36b, 36c and 36d includes at least one light source for producing a number of light rays and an elongated carrier for carrying the at least one light sources. The elongated carrier is preferably adapted for directing the light rays down to the boat hull 32 along a longitudinally extending axis, wherein the longitudinally extending axis has a length that is substantially longer than the width of the carrier, as shown. FIGS. 3-5 below show a number of illustrative placements for the boat lights of FIGS. 2 and 6-12.

It is also contemplated that when the upper deck 31 includes one or more relatively vertically extending surfaces, additional boat lights 38 may be provided to illuminate these side surfaces as well. This may even further increase the visibility of the boat 30.

FIG. 3 is a schematic view of a boat hull having a number of boat lights, each directing light rays in a downward direction. While rectangular shaped boat lights are shown, it is contemplated that the boat lights may assume any desired shape. A hull is illustrated at 40 with a number of boat lights 40a, 40b, 40c and 40d mounted thereto. Boat lights 40a and 40b are shown mounted near the top of hull 40 and provide light rays in a generally downward direction. Boat lights 40c and 40d are shown mounted in an intermediate location on hull 40, and also provide light rays in a generally downward direction.

It is recognized that only the upper row of boat lights 40a and 40b may be necessary to illuminate the boat hull 40 down to the expected water line. However, it is contemplated that some hull designs may curve significantly inward toward the expected water line. For these boat hulls, one or more lower rows of boat lights, such as boat lights 40c and 40d, may be provided to illuminate the lower portion of the boat hull 40.

FIG. 4 is a schematic view of a boat hull having a number of boat lights, each directing light rays in an upward direction. A hull is illustrated at 46 with a number of boat lights 48a and 48b mounted thereto. Boat lights 48a and 48b are shown mounted on a lower portion of hull 46, and provide light rays in a generally upward direction.

FIG. 5 is a schematic view of a boat hull having a number of boat lights, each directing light rays in forward and backward direction. A hull is illustrated at 50 with a number of boat lights 52a and 52b mounted thereto. Boat lights 52a and 52b are shown mounted on the hull 50, and may provide light rays in either a forward direction, a backward direction or both. For example, boat light 52a may provide light rays 54a in a generally backward direction, light rays 54b in a generally forward direction, or both.

Figure 6:
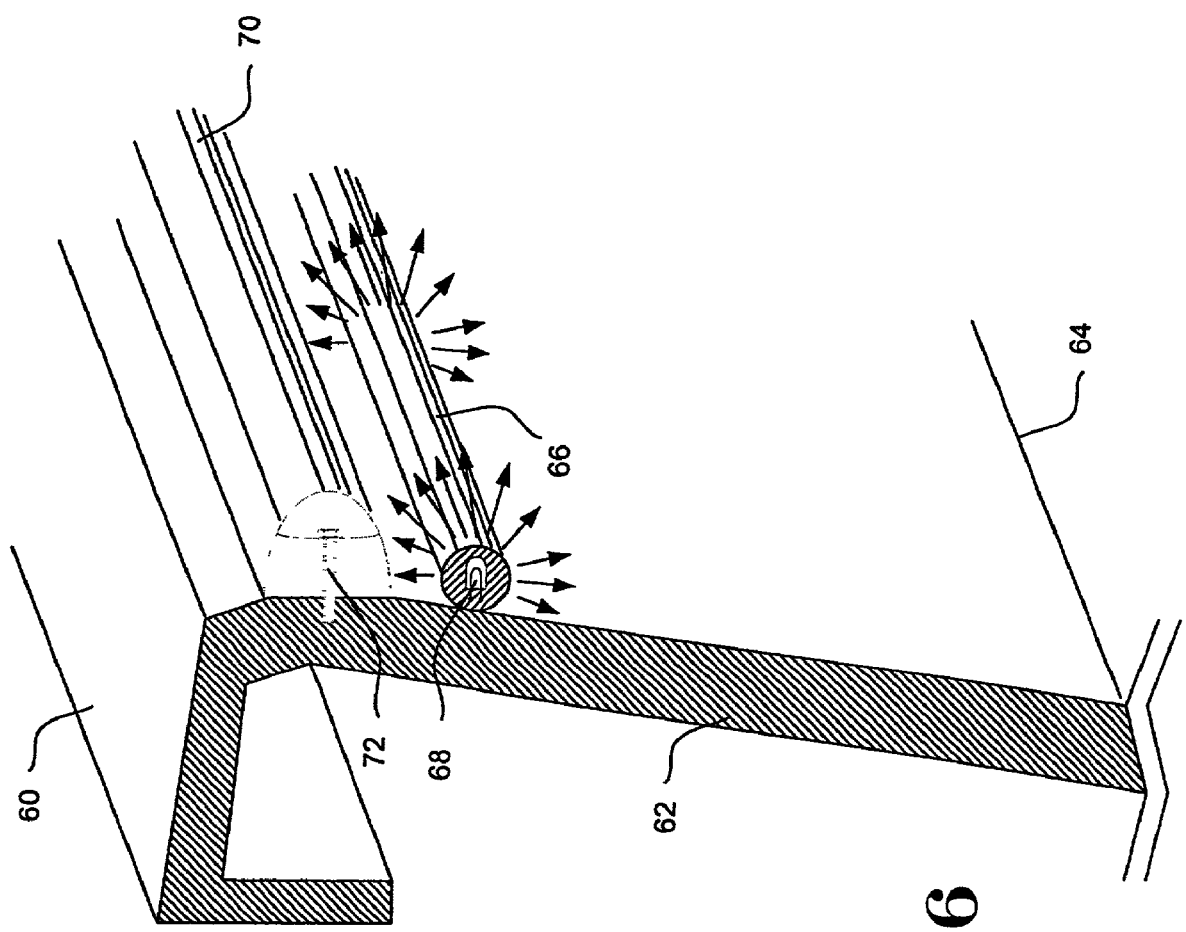
FIG. 6 is a partial cross-sectional perspective view of a boat hull having an illustrative elongated light apparatus.

FIG. 6 is a partial cross-sectional perspective view of a boat hull 60 having an illustrative elongated boat lighting apparatus 66. The boat hull 60 includes a generally downward extending portion 62 that extends to an expected water line 64. The boat hull 60 may also include a bumper assembly 70 for protecting the boat hull 60 from docks or the like. The bumper assembly 70 is shown mounted on a top portion of the downward extending portion 62 of the boat hull 60 via mounting bolt 72.

The elongated boat lighting apparatus 66 is shown mounted to the downward extending portion 62 just below the bumper assembly 70. The elongated boat lighting apparatus 66 includes at least one light source for producing a number of light rays as shown, and an elongated carrier for carrying the at least one light source. The elongated carrier is preferably at least partially transparent to allow the light rays produced by the one or more light source to exit the carrier. In the embodiment shown, the light rays exit the carrier in various directions including down to the downward extending portion 62 of the boat hull 60, horizontally away from the boat hull 60, and upward toward the bumper assembly 70. However, in a preferred embodiment, a redirector (not shown) may be positioned adjacent the top and outer side of the carrier to redirect substantially all of the light rays to the downward extending portion 62 of the boat hull 60. The redirector may include, for example, a separate shield placed around the top and outer side of the carrier, or may simply be a reflective coating positioned on the top and outer side surface of the carrier. Alternatively, the elongated boat lighting apparatus 66 may be incorporated into the bumper assembly 70, similar to that shown in FIG. 9.

In one embodiment, the elongated boat lighting apparatus 66 may be constructed similar to the indoor/outdoor decorative cable lights available from Light Tech, Inc., Grand Rapids, Mich. These cable lights have a parallel series of micro-tungsten bulbs wired on one inch centers and extruded in a flexible PVC clear resin carrier. The PVC helps distribute the light rays provided by the bulbs to provide a more uniform illumination along the length of the carrier. The PVC carrier also helps protect the bulbs from water, vibration and other undesirable environmental conditions.

Figure 7:
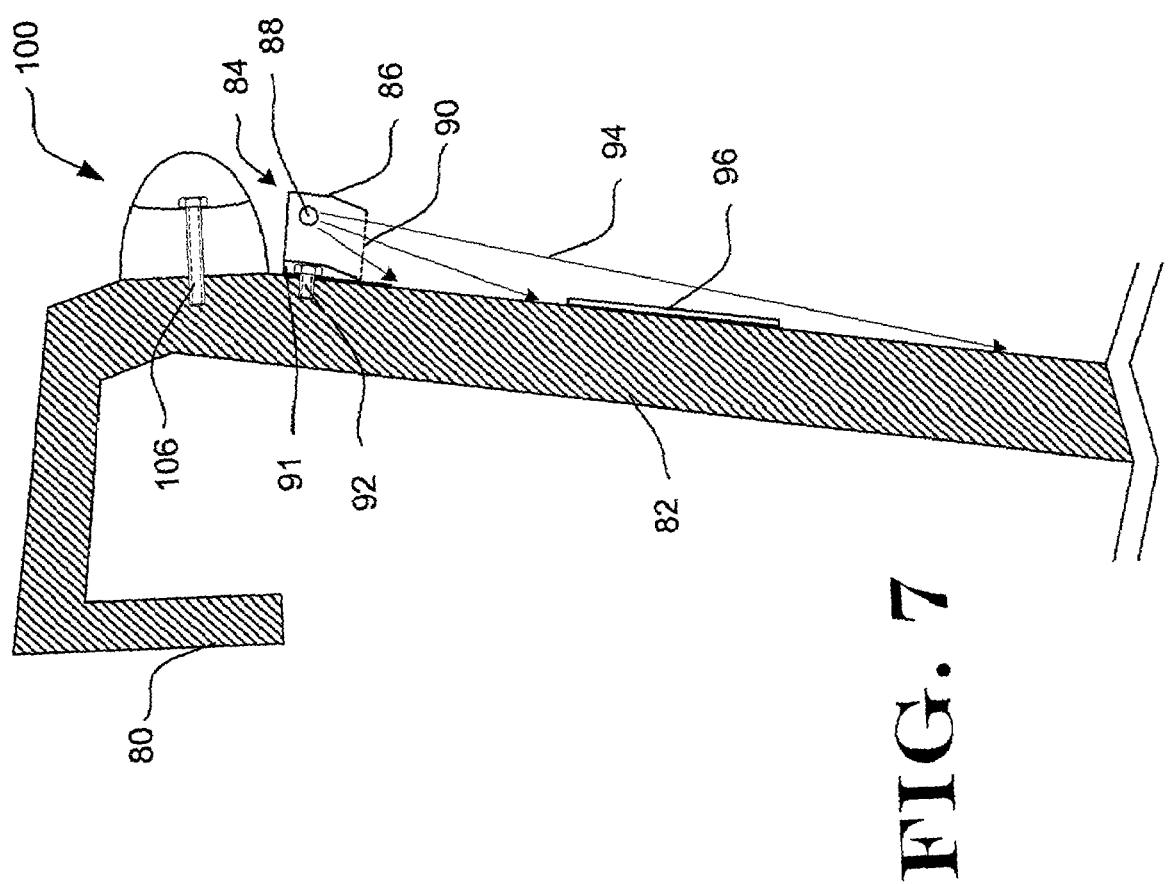
FIG. 7 is a partial cross-sectional side view of a boat hull having another illustrative boat lighting apparatus.

FIG. 7 is a partial cross-sectional side view of a boat hull having another illustrative boat lighting apparatus. The boat hull 80 includes a generally downward extending portion 82 that extends to an expected water line. The boat hull 80 may also include a bumper assembly 100 for protecting the boat hull 80 from docks or the like. The bumper assembly 80 is shown mounted on a top portion of the downward extending portion 82 of the boat hull 80 via mounting bolt 106.

In the illustrative embodiment, boat lighting apparatus 84 is mounted to the downward extending portion 82, just below the bumper assembly 100. The boat lighting apparatus 84 includes one or more light sources 88 for providing light rays, a housing 86 for carrying the light source 88, and a mount 91 for mounting the housing 86 to the boat. The mount 91 is shown bolted to the side of the downward extending portion 82 of the hull via a bolt or screw 92. It is contemplated, however, that any number of means may be used to attach the mount to the boat including an adhesive or the like.

The housing 86 preferably has at least one opening 90 for directing the light rays 94 to at least a portion of the hull of the boat. In the illustrative embodiment shown, the housing 86 includes a wall that extends around three sides of the light source 88, leaving the one opening 90 on the fourth downward side. Such a configuration not only helps direct the light rays 94 toward the hull of the boat, but also helps prevent at least a portion of the light rays from traveling laterally away from the hull of the boat. The inside surface of the housing 86 may be reflective, and may be shaped to help redirect the light rays 94 in a downward direction toward the hull of the boat. The housing 86 may also include a bracket (not shown) for carrying the one or more light sources 88.

A transparent or semi-transparent plate may be positioned across the opening 90. The transparent or semi-transparent plate may be constructed as a lens or the like to help redirect and/or focus the light on the hull of the boat. It is also contemplated that the transparent or semi-transparent plate may include a pattern provided thereon or therein to cause an image to be projected onto the hull of the boat. Finally, the transparent or semi-transparent plate may help protect the one or more light sources 88 from water or other undesirable environmental conditions.

It is contemplated that the one or more light sources 88 may be any type of light source including an incandescent light source, a fluorescent light source, a light emitting diode (LED), any type of laser including one or more vertical cavity surface emitting lasers (VCSEL), a phosphor material, or any other type of light source, either active or passive, that is capable of producing visible light at night. When using light sources that provide directed light rays, such as a laser, it is recognized that a light redirector may not be required. Finally, it is contemplated the one or more light sources 88 may be provided by one or more remotely located light sources that are coupled to a fiber optic cable or other type of light transmitting medium that can deliver light rays locally to the housing 86.

Finally, to enhance the illumination of the hull of the boat, it is contemplated that a reflective medium 96 may be provided in or on the outer surface of the boat as shown. The reflective medium preferably helps reflect the light rays 94 laterally outward and away from the hull of the boat to enhance the visibility of the boat. It is contemplated that the reflective medium may be patterned to form an image. The image may be, for example, the name of the boat, advertising logos or any other desired image.

Figure 8:
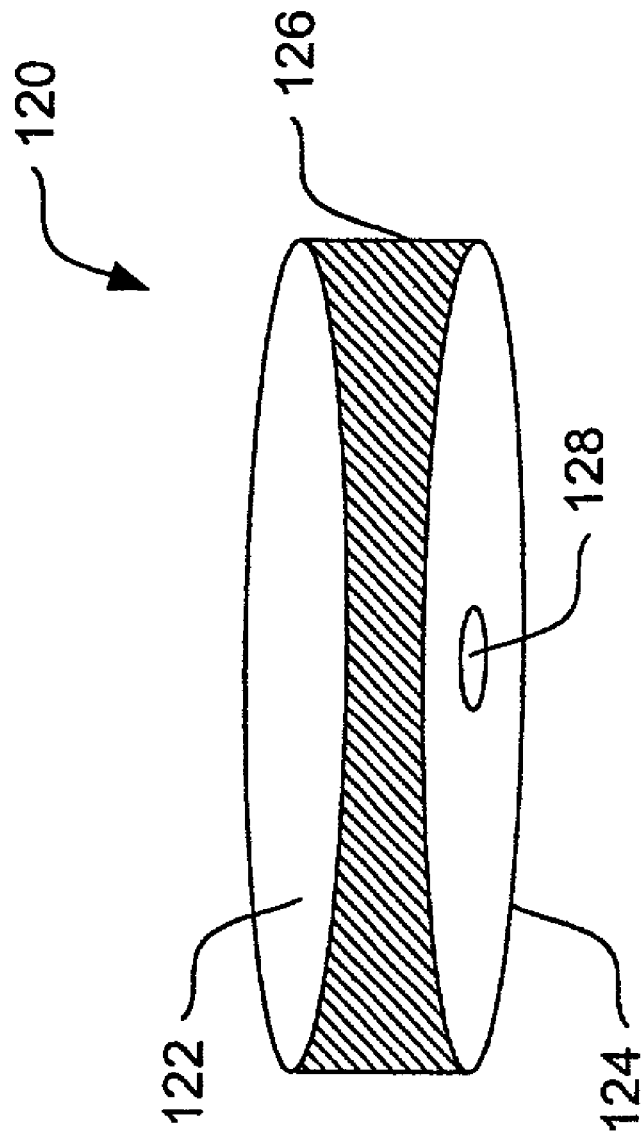
FIG. 8 is a perspective view of another illustrative boat lighting apparatus in accordance with the present invention.
Figure 8:
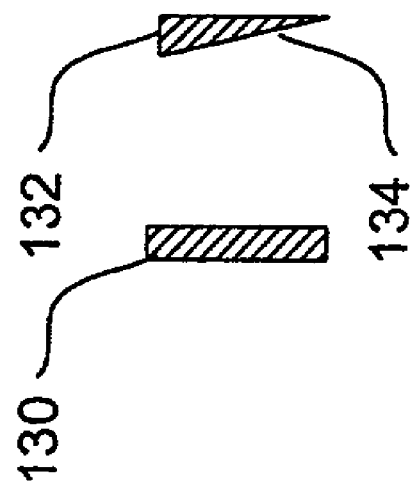

FIG. 8 is a perspective view of another illustrative boat lighting apparatus in accordance with the present invention. This illustrative boat lighting apparatus includes a round housing 120 that has an outer plate 122 and an inner plate 124. The inner plate 124 is preferably positioned adjacent the boat hull when installed, and includes a hole 128 for receiving wires or the like to power a local light source. While a round housing is shown, it is contemplated that the housing 120 may be any shape.

A side plate 126 extends around part of the perimeter of the outer plate 122 and the inner plate 124. In the embodiment shown, the side plate 126 extends around the perimeter of about the upper half of the outer plate 122 and inner plate 124, leaving the perimeter around the lower half open. A light source (not shown) is preferably provided in the space between the outer plate 122 and the inner plate 124. In this configuration, the outer plate 122, inner plate 124 and side plate 126 help redirect the light rays provided by the light source downward through the opening toward the hull of the boat.

A transparent or semi-transparent plate 130 may extends around the lower perimeter of the outer plate 122 and the inner plate 124. The transparent or semi-transparent plate 130 helps protect the light source from water and other undesirable environmental conditions. It is contemplated that the transparent or semi-transparent plate may be configured as a lens or the like to help focus or redirect the light rays to the hull of the boat. One such transparent or semi-transparent plate is illustrated at 132, and has an outer surface 134 that tapers inward toward the boat. Because the lens is thicker away from the boat, the light rays traveling parallel to the hull of the boat are refracted more than those light rays that are already traveling toward the hull of the boat. This may help increase the illumination of the hull of the boat.

Figure 9:
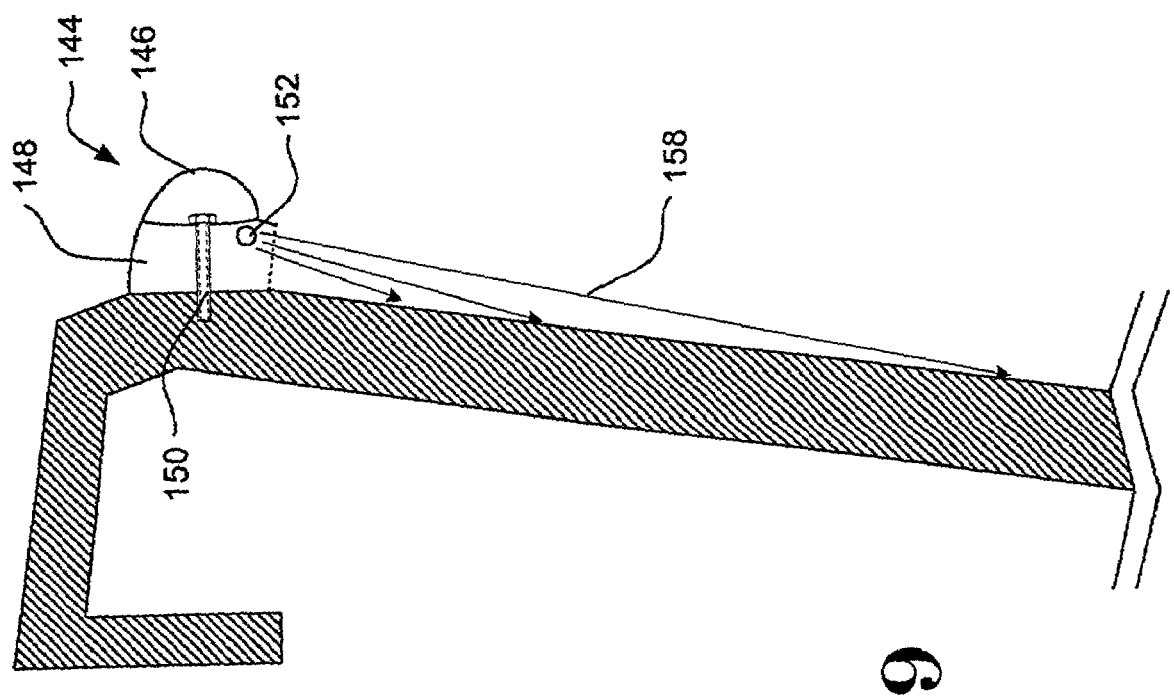
FIG. 9 is a partial cross-sectional side view of a boat hull having a boat lighting apparatus incorporated into a side bumper assembly.

FIG. 9 is a partial cross-sectional side view of a boat hull with yet another boat lighting apparatus. This embodiment is similar to that shown in FIG. 7, but has the boat lighting apparatus integrated or incorporated into the bumper assembly 144. The bumper assembly 144 includes a flexible bumper guard 146 attached to an elongated housing 148. The elongated housing 148 is attached to the hull of the boat via a bolt or screw 150. The elongated housing 148 preferably has a cavity therein for receiving one or more light sources 152. The cavity is preferably open along the lower surface thereof to allow the light rays 158 to illuminate the hull of the boat.

Figure 10:
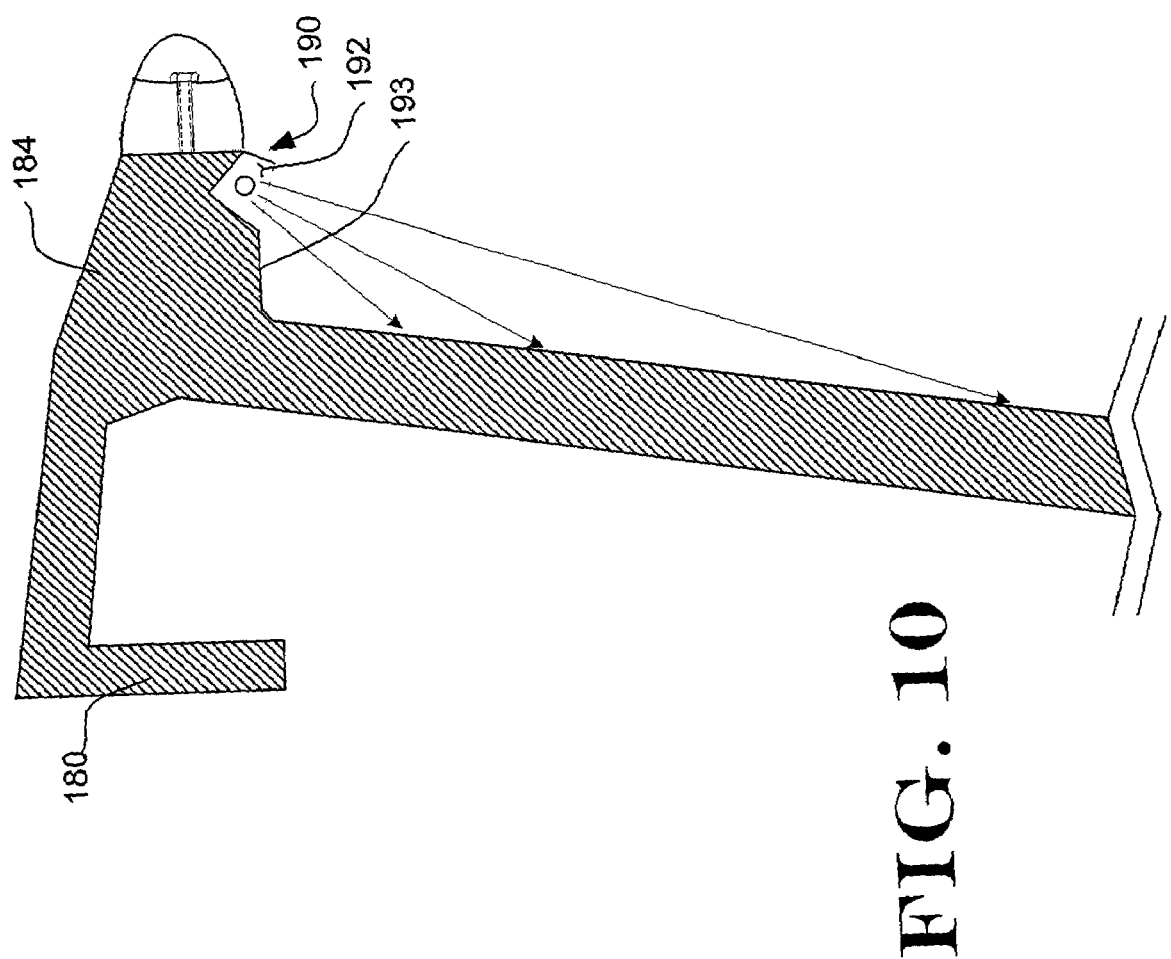
FIG. 10 is a partial cross-sectional side view of a boat hull having a boat lighting apparatus incorporated into an outward extending hull portion.

FIG. 10 is a partial cross-sectional side view of a boat hull having a boat lighting apparatus incorporated into an outward extending hull portion. In this embodiment, the boat hull 180 includes an outward extending hull portion 184. The boat lighting apparatus 190 may then be provided in a cavity 192 provided in the lower surface of the outward extending hull portion 184. Alternatively, a boat lighting apparatus similar to that shown in FIG. 7, for example, may be mounted to a lower surface 193 of the outward extending hull portion 184 to illuminate the hull of the boat.

Figure 11:
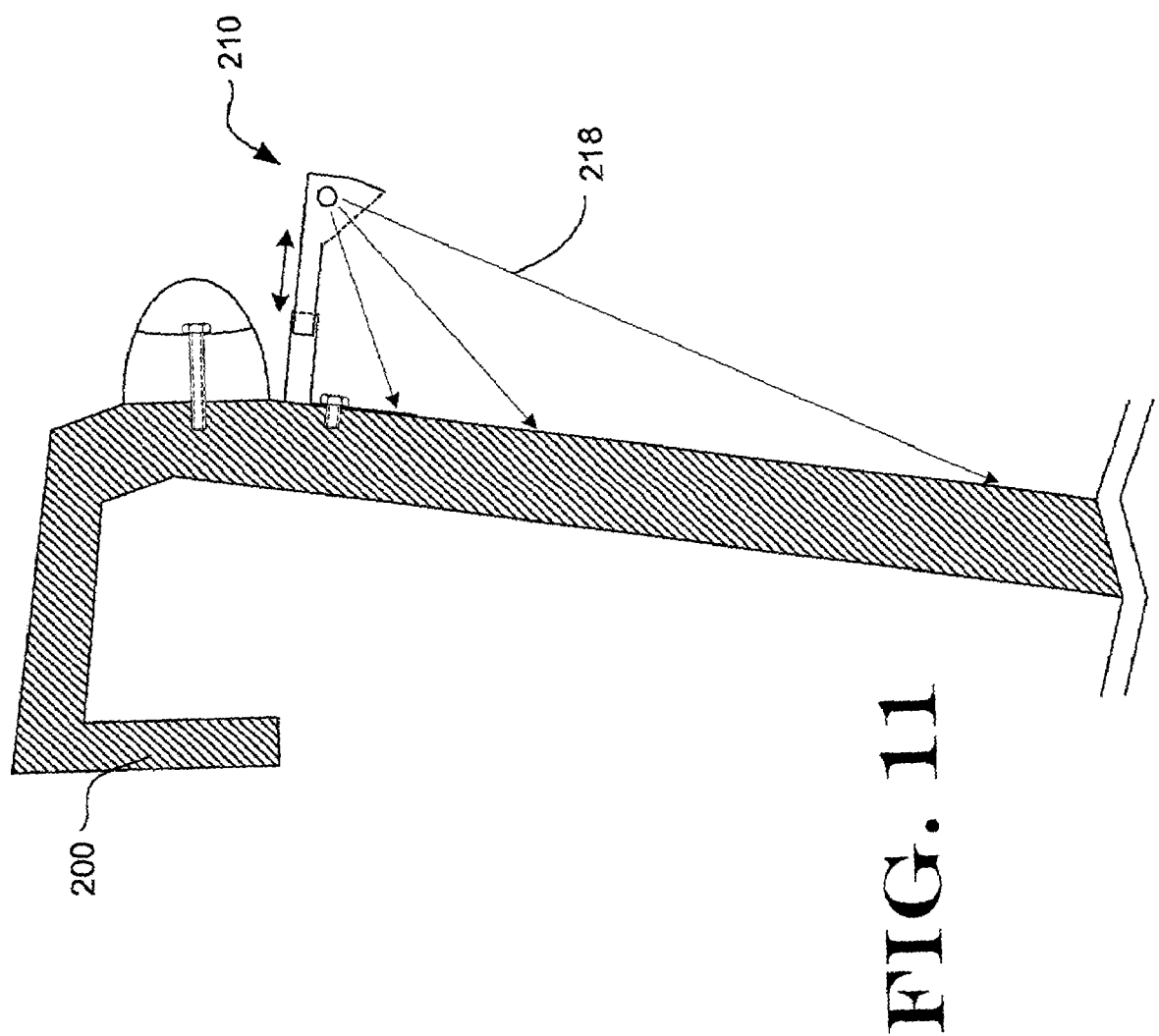
FIG. 11 is a partial cross-sectional side view of a boat hull having a telescoping boat lighting apparatus.

FIG. 11 is a partial cross-sectional side view of a boat hull having a telescoping boat lighting apparatus. In this embodiment, the boat lighting apparatus 210 has a housing that includes a telescoping lever for allowing the light source to be selectively pulled laterally away from the boat. When extended, the light source is further away from the boat hull, thereby increasing the angle of incidence of the light rays 218 at the hull of the boat. By increasing the angle of incidence, the amount of light that is reflected laterally away from the boat may be increased, thereby increasing the visibility of the hull. When contracted, the boat lighting apparatus 210 is preferably safely out of the way to reduce the chance that the boat lighting apparatus 210 will become damaged by other boats, docks or the like.

Figure 12:
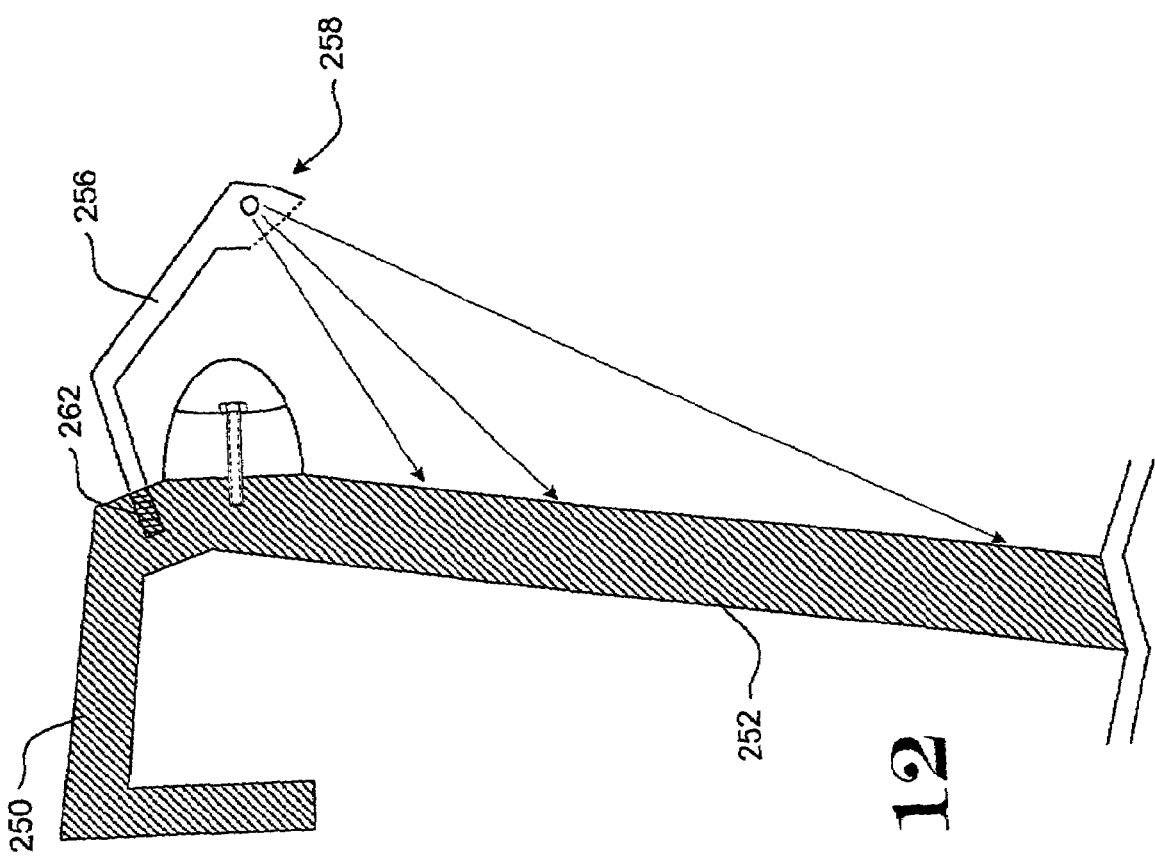
FIG. 12 is a partial cross-sectional side view of a boat hull having a threaded boat lighting apparatus.

FIG. 12 is a partial cross-sectional side view of a boat hull having a threaded boat lighting apparatus. In this embodiment, the boat lighting apparatus 258 includes a threaded end 262. The threaded end 262 preferably is adapted to engage a threaded hole in the hull of the boat. This allows the boat lighting apparatus 258 to be easily removed from the hull of the boat during, for example, daylight hours. In the illustrative embodiment, the boat lighting apparatus 258 is mounted near the top of the hull 250 so that boater inside the boat can easily remove the lights. In this configuration, a laterally extending portion 256 may be provided to extend the light source a sufficient distance away from the boat hull to adequately illuminate the hull of the boat. While the boat lighting apparatus 258 is shown mounted near the top of the hull 250, it is contemplated that the boat lighting apparatus 258 may be mounted anywhere on the boat, including further down on the downward extending portion 252.

Figure 13:
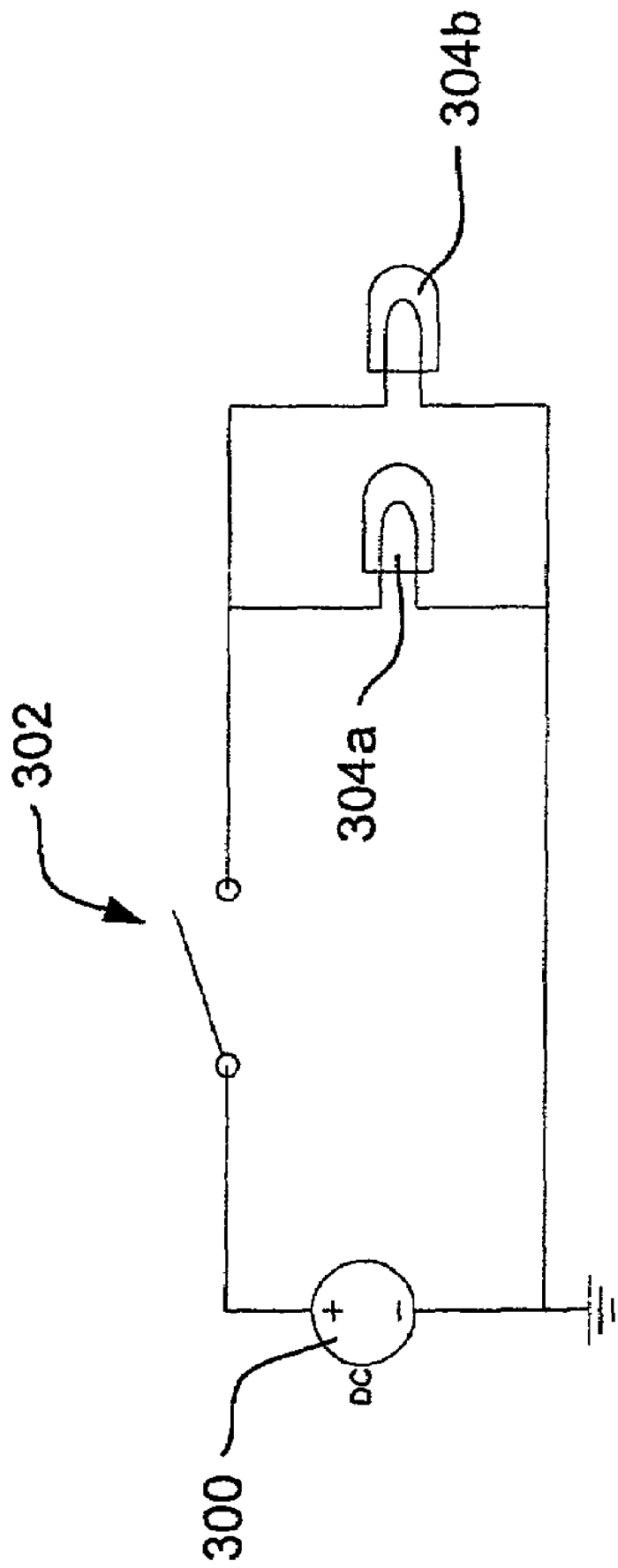
FIG. 13 is a schematic view of an illustrative circuit for powering the one or more light sources of the present invention.

FIG. 13 is a schematic view of an illustrative circuit for powering the one or more light sources of the present invention. In the embodiment shown, a power source 300 is coupled to one or more light sources 304a and 304b via switch 302. The one or more light sources 304a and 304b are preferably coupled in a parallel configuration with power source 300, as shown. This allows each light source 304a and 304b to continue to operate even when one or more of the remaining light sources burns out or otherwise becomes damaged. The power source 300 may be any type of power source, but preferably is the boat battery, the boat alternator, or any other type of power source that is capable of properly driving the one or more light sources 304a and 304b.

Figure 14:
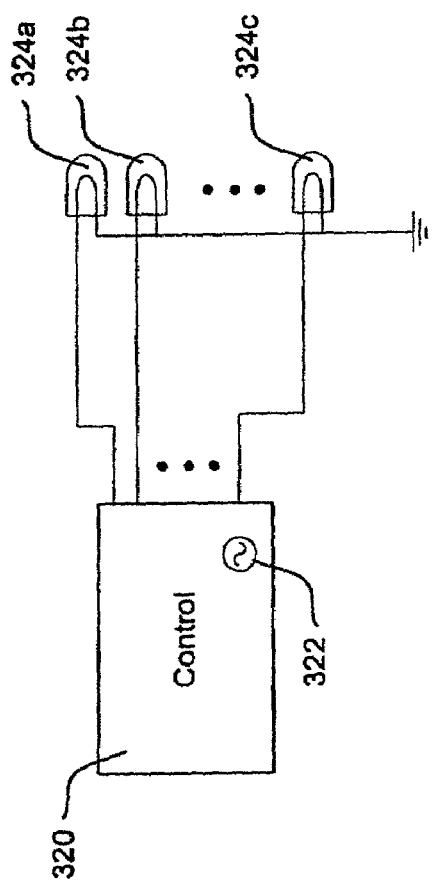
FIG. 14 is a schematic view of another illustrative circuit for powering the one or more light sources of the present invention.

FIG. 14 is a schematic view of another illustrative circuit for powering the one or more light sources of the present invention. In this embodiment, an electronic control circuit 320 provides power to each of a number of light sources 324a, 324b and 324c. The electronic control circuit receives power from a power source 322, and may be any type of control circuit that provides the desired functionality. Preferably, the control circuit is a simple state machine, a microprocessor, or any other type of control circuit.

Figure 15:
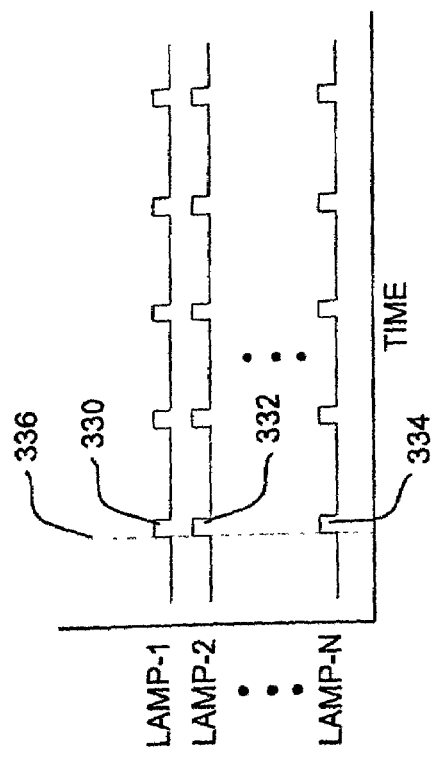
FIG. 15 is a timing diagram showing one illustrative energizing scheme provided by the control block of FIG. 14.

FIG. 15 is a timing diagram showing one illustrative energizing scheme that can be provided by the control circuit 320 of FIG. 14. In this illustrative embodiment, the control circuit 320 simultaneously provides energizing pulses 330, 332 and 334 to light sources 324a, 324b and 324c, respectively, for example at time 336. Each of the energizing pulses 330, 332 and 334 has the same duration. Accordingly, this causes each of the light sources 324a, 324b and 324c to blink "on" during the corresponding energizing pulse, and "off" after the energizing pulse terminates. After a time period, all of the light sources 324a, 324b and 324c are again energized. This causes each of the light sources 324a, 324b and 324c to simultaneously blink "on" and "off". It is believed that a blinking light may increase the visibility of the hull, especially for inattentive boaters.

Figure 16:
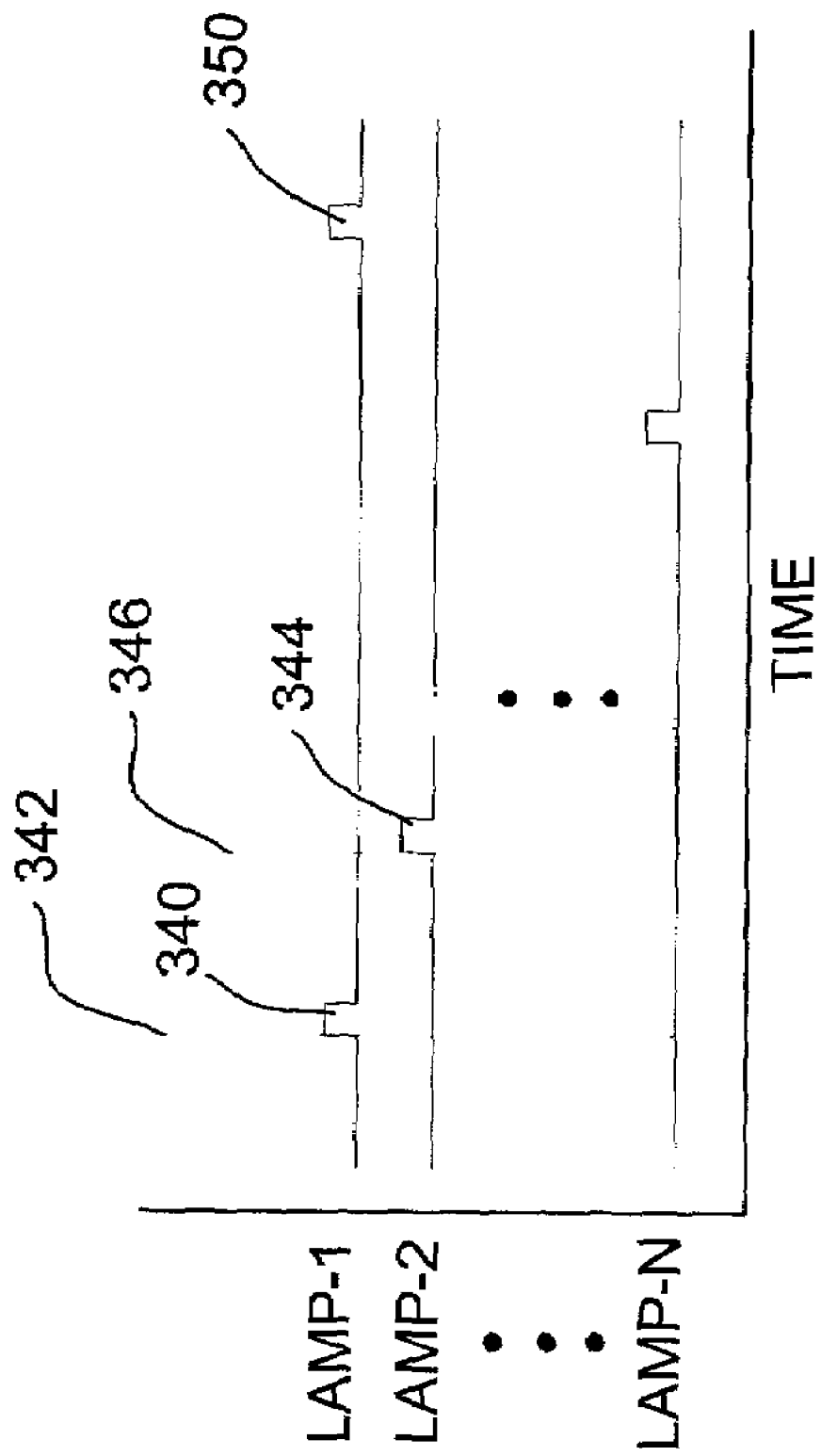
FIG. 16 is a timing diagram showing another illustrative energizing scheme provided by the control block of FIG. 14.

FIG. 16 is a timing diagram showing another illustrative energizing scheme that can be provided by the control circuit 320 of FIG. 14. In this illustrative embodiment, each of the light sources is energized in a sequential manner. For example, light source 324a is energized by energizing pulse 340 at time 342. Later, light source 324b is energized by energizing pulse 344 at time 346. Finally, light source 324c is energized. This sequence may be repeated. In a preferred embodiment, the light sources 324a, 324b and 324c are spaced longitudinally along the length of the boat. By illuminating the light sources in sequence, a moving or sweeping pattern may be generated across the hull of the boat. This may further increase the visibility of the hull of the boat. It is recognized that the embodiments shown in FIGS. 14-16 are only illustrative, and that numerous other lighting sequences can be used.

Figure 17:
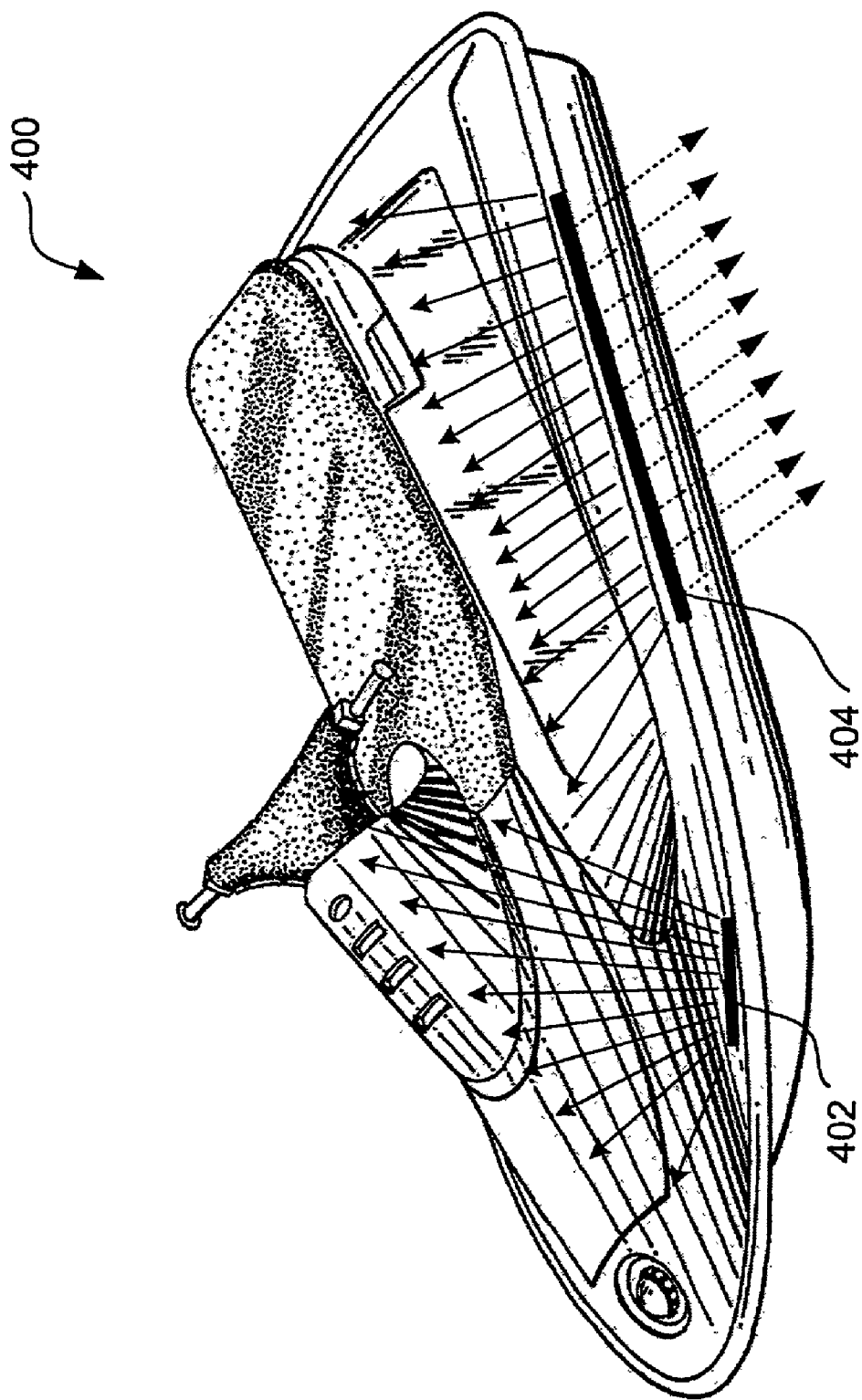
FIG. 17 is a perspective view of a personal watercraft having a boat lighting apparatus mounted thereto.

FIG. 17 is a perspective view of a personal watercraft having one or more boat lights 402 and 404 mounted thereto. Boat lights 402 and 404 are preferably similar to that described above and preferably illuminate at least a portion of the side surfaces of the personal watercraft. While a personal watercraft is shown in FIG. 17, it is contemplated that the boat lighting apparatus of the present invention may be used to light the side surfaces of airplanes, snowmobiles, automobiles, all terrain vehicles, or any other type of "vehicle" as that term is used in the most general sense,to increase their visibility to outside observers.

Having thus described the preferred embodiments of the present invention, those of skill in the art will readily appreciate that the teachings found herein may be applied to yet other embodiments within the scope of the claims hereto attached.

What is claimed is:

1. A light adapted for use with a boat having a length, the light comprising:

an elongated light source for emitting light rays; and an elongated bumper for carrying the elongated light source, said elongated bumper having a length and allowing light rays from the elongated light source to be emitted along at least a major length of at least one side of a boat, the elongated bumper including an elongated carrier and an elongated bumper guard, wherein the elongated bumper guard is adapted to be coupled to the elongated carrier with at least part of the elongated bumper guard extending out past the elongated carrier in a direction laterally away from the boat to provide a primary bumper surface, and wherein the elongated carrier has a back surface adapted to be situated adjacent the boat, and an upper surface and a lower surface extending away from the boat, and where in cross-section, at least a majority of the elongated light source is situated between the upper and lower surfaces of the elongated carrier, and the elongated light source is further situated directly behind the primary bumper surface of the elongated bumper guard.

2. A light according to claim 1 wherein the elongated light source includes an active light source.

3. A light according to claim 1 wherein the elongated light source includes a passive light source.

4. A light according to claim 1 wherein the elongated light source includes a light transmitting medium.

5. A light according to claim 1 wherein the elongated light source includes an optical fiber.

6. A light according to claim 1 wherein the elongated light source includes a phosphor.

7. A light according to claim 1 wherein the elongated light source includes an active and a passive light source.

8. A light according to claim 1 further comprising an elongated cavity extending along a length of the elongated bumper, the elongated cavity adapted to receive the elongated light source.

9. A light according to claim 8 further comprising an elongated opening extending along a length of the elongated cavity, the elongated opening providing access to the elongated cavity.

10. A light according to claim 8 wherein the elongated bumper includes a transparent or semi-transparent material that extends between the elongated cavity to an outer surface of the elongated bumper.

11. A boat comprising:
two or more outer side surfaces;
an elongated light source;
an elongated bumper having a cavity for receiving the elongated light source, the elongated bumper secured relative to and extending longitudinally along at least a major length of at least one of the side surfaces of the boat, the elongated bumper having a bumper surface that is spaced laterally away from the at least one of the side surfaces of the boat, wherein the elongated light source is situated in the cavity directly behind the bumper surface such that the bumper surface helps shield and protect the elongated light source; and
the elongated bumper includes an elongated carrier and an elongated bumper guard, wherein the elongated bumper guard is coupled to the elongated carrier such that the elongated bumper guard does not become dislodged from the elongated carrier when the elongated bumper guard engages docks and other objects during normal use of the boat.

12. A boat according to claim 11 wherein the elongated light source includes an active light source.

13. A boat according to claim 11 wherein the elongated light source includes a passive light source.

14. A boat according to claim 11 wherein the elongated light source includes a light transmitting medium.

15. A boat according to claim 11 wherein the elongated light source includes an optical fiber.

16. A boat according to claim 11 wherein the elongated light source includes a phosphor.

17. A boat according to claim 11 wherein the elongated bumper includes a transparent or semi-transparent material that extends from the cavity to an outer surface of the elongated bumper.

18. A boat according to claim 11 further comprising an elongated opening extending along a length of the cavity, the elongated opening providing access to the elongated cavity.

19. A light adapted for use with a boat, comprising:
a bumper assembly extending generally horizontally along at least a major part of at least one side of the boat, the bumper assembly providing a bumper function for the boat, the bumper assembly including a light source for emitting light rays, wherein the bumper assembly includes a bumper surface that is facing away from the boat, and wherein the light source is situated directly behind the bumper surface of the bumper assembly such that the bumper surface helps shield and protect the light source; and
the bumper assembly including an elongated carrier and an elongated bumper guard, wherein the elongated bumper guard includes at least part of the bumper surface, and is coupled to the elongated carrier, wherein the elongated carrier has a back surface situated adjacent the boat, and a terminating end portion having a shape that is spaced from the back surface and the boat and is at a terminating end of the elongated carrier, at least part of the elongated bumper guard having a surface that is shaped as the complement of the shape of at least part of the terminating end portion of the elongated carrier for engaging the at least part of the terminating end portion of the elongated carrier and for passing an applied force to the bumper surface of the elongated bumper guard to the elongated carrier.

20. A light according to claim 19 wherein the light source is an elongated light source.

21. A light according to claim 20 wherein the bumper assembly includes an elongated cavity for receiving the elongated light source.

22. A light according to claim 21 wherein the bumper assembly includes a transparent or semi-transparent material that extends from the cavity to an outer surface of the bumper assembly.

23. A light according to claim 22 wherein the bumper assembly includes a non-transparent material that extends from the cavity to an outer surface of the bumper assembly.

24. A light according to claim 21 wherein the cavity is sized larger than an outer dimension of the elongated light source.

25. A light according to claim 24 wherein the cavity is sized significantly larger than the outer dimension of the elongated light source.

26. A light according to claim 21 further comprising an elongated opening extending along a length of the elongated cavity, the elongated opening providing access to the elongated cavity.

27. A light adapted to be mounted to a protected surface, the light comprising:
an elongated light source for emitting light rays; and
an elongated bumper for carrying the elongated light source, said elongated bumper allowing light rays from the elongated light source to be emitted along at least part of the elongated bumper, the elongated bumper including an elongated carrier and an elongated bumper guard, wherein the elongated bumper guard is adapted to be coupled to the elongated carrier with at least part of the elongated bumper guard extending out past the elongated carrier in a direction laterally away from the protected surface to provide a primary bumper surface, and wherein the elongated carrier has a back surface to be situated adjacent the protected surface, and an upper surface and a lower surface extending away from the protected surface, where in cross-section, at least a majority of the elongated light source is situated between the upper and lower surfaces of the elongated carrier, and the elongated light source is situated directly behind the primary bumper surface such that the primary bumper surface helps shield and protect the elongated light source.

28. A light according to claim 27 wherein the elongated light source includes an active light source.

29. A light according to claim 27 wherein the elongated light source includes a passive light source.

30. A light according to claim 27 wherein the elongated light source includes a light transmitting medium.

31. A light according to claim 27 wherein the elongated light source includes an optical fiber.

32. A light according to claim 27 wherein the elongated light source includes a phosphor.

33. A light according to claim 27 wherein the elongated bumper includes a cavity for receiving the elongated light source, and a transparent or semi-transparent material that extends from the cavity to an outer surface of the elongated bumper.

34. A light according to claim 33 wherein the elongated bumper includes a non-transparent material that extends from the cavity to at least a portion of the primary bumper surface.

35. A light according to claim 33 wherein the cavity is sized larger than an outer dimension of the elongated light source.

36. A light according to claim 33 wherein the cavity is sized significantly larger than an outer dimension of the elongated light source.

37. An elongated bumper assembly, comprising:
an elongated light source; and
an elongated bumper for accepting the elongated light source;
the elongated bumper having a mounting side and an exposed side, wherein the exposed side has a primary bumper surface, the elongated light source being positioned in a cavity directly behind the primary bumper surface so that the primary bumper surface helps protect the elongated light source from incoming objects, and wherein light from the elongated light source escapes to the exposed side of the elongated bumper assembly within the bounds defined by an arc having a center at the elongated light source and an angular span of less than 180 degrees.

38. An elongated bumper assembly according to claim 37, further comprising:
mounting means for mounting the elongated bumper to the side surface of a boat so that the mounting side of the elongated bumper is adjacent to the side surface of the boat.

* * * * *